(12) United States Patent
Yin et al.

(10) Patent No.: US 12,169,280 B2
(45) Date of Patent: Dec. 17, 2024

(54) OPTICAL DISPLAY SYSTEM AND ELECTRONICS APPARATUS

(71) Applicants: University of Central Florida Research Foundation, Inc., Orlando, FL (US); Goertek Inc, Shandong (CN)

(72) Inventors: Kun Yin, Oviedo, FL (US); Ziqian He, Oviedo, FL (US); Shin-Tson Wu, Orlando, FL (US); Kun Li, Santa Clara, CA (US)

(73) Assignees: University of Central Florida Research Foundation, Inc., Orlando, FL (US); Goertek Inc., Shandong (CN)

( * ) Notice: Subject to any disclaimer, the term of this patent is extended or adjusted under 35 U.S.C. 154(b) by 0 days.

(21) Appl. No.: 18/277,130

(22) PCT Filed: Mar. 1, 2022

(86) PCT No.: PCT/CN2022/078657
§ 371 (c)(1),
(2) Date: Aug. 14, 2023

(87) PCT Pub. No.: WO2022/184062
PCT Pub. Date: Sep. 9, 2022

(65) Prior Publication Data
US 2024/0126082 A1 Apr. 18, 2024

Related U.S. Application Data
(60) Provisional application No. 63/154,979, filed on Mar. 1, 2021.

(51) Int. Cl.
*G02B 27/01* (2006.01)
*G02B 27/00* (2006.01)
*G02B 27/28* (2006.01)

(52) U.S. Cl.
CPC ..... *G02B 27/0172* (2013.01); *G02B 27/0093* (2013.01); *G02B 27/286* (2013.01); *G02B 2027/0147* (2013.01)

(58) Field of Classification Search
CPC ............ G02B 27/0172; G02B 27/0093; G02B 27/286; G02B 2027/0147
See application file for complete search history.

(56) References Cited

U.S. PATENT DOCUMENTS

| 11,022,784 B1 * | 6/2021 | Wheelwright ....... G02B 27/286 |
| 2017/0068105 A1 * | 3/2017 | Yun ..................... G02B 27/148 |

(Continued)

FOREIGN PATENT DOCUMENTS

WO   WO-2023051479 A1 * 4/2023

OTHER PUBLICATIONS

"Enhancing the resolution of a near-eye display with a Pancharatnam-Berry phase deflector"; Lee et al., Optics Letters, vol. 42, No. 22, Nov. 15, 2017, 4732-4735 (Year: 2017).*

(Continued)

*Primary Examiner* — Temesghen Ghebretinsae
*Assistant Examiner* — K. Kiyabu
(74) *Attorney, Agent, or Firm* — Baker Botts LLP

(57) ABSTRACT

An optical display system and an electronics apparatus are disclosed. The optical display system comprises: a display unit, which generate a first image light and a second image light, wherein the first image light is in a first polarization state and the second image light is in a second polarization state and the first image light and the second image light are generated by a same display panel; a resolution enhancement optic unit, which enhances the resolution of the first image light with respect to the second image light; and a magnifying optic unit, which magnify the first and second image lights from the resolution enhancement optic unit.

6 Claims, 2 Drawing Sheets

(56) References Cited

U.S. PATENT DOCUMENTS

| | | | | |
|---|---|---|---|---|
| 2017/0068134 A1* | 3/2017 | Yadin | .................. | G02F 1/29 |
| 2019/0285891 A1* | 9/2019 | Lam | .................. | G02F 1/133526 |
| 2019/0318677 A1* | 10/2019 | Lu | .................. | G02B 27/0093 |
| 2020/0132990 A1* | 4/2020 | Milford | .................. | G02B 30/10 |
| 2021/0208389 A1* | 7/2021 | Lu | .................. | G02B 27/0093 |
| 2022/0252885 A1* | 8/2022 | Wang | .................. | G02B 27/286 |
| 2024/0085700 A1* | 3/2024 | Signoretto | .................. | G02B 27/0172 |
| 2024/0184124 A1* | 6/2024 | Altaqui | .................. | G02B 27/0179 |
| 2024/0248363 A1* | 7/2024 | Oh | .................. | G02F 1/13306 |

OTHER PUBLICATIONS

"Improving near-eye display resolution by polarization multiplexing"; Zhan et al., Optics Express, vol. 27, No. 11, May 27, 2019, 15327-15334 (Year: 2019).*

"High-Resolution Additive Light Field Near-Eye Display by Switchable Pancharatnam-Berry Phase Lenses"; Zhan et al., Optics Express, vol. 26, No. 4, Feb. 19, 2018, 4863-4872 (Year: 2018).*

"Compact See-Through Near-Eye Display with Depth Adaption"; Lee et al., Journal of the Society for Information Display, 26/2, Mar. 2018, ResearchGate title page and 64-70 (Year: 2018).*

"Pancharatnam-Berry Optical Elements for Head-Up and Near Eye Displays"; Zhan et al., Journal of the Optical Society of America B, vol. 36, No. 5, May 2019, D52-D65 (Year: 2019).*

"Emerging Near-Eye Displays with Pancharatnam-Berry Optical Elements"; Zhan et al., International Display Workshops 2019, 236-239 (Year: 2019).*

"High-Efficiency Switchable Optical Elements for Advanced Head-Up Displays"; Zhan et al., Journal of the Society for Information Display, 2019: 27: 223-231 (Year: 2019).*

"Broadband Wide-View Pancharatnam-Berry Phase Deflector"; Zou et al., Optics Express, vol. 28, No. 4, Feb. 17, 2020, 4921-4927 (Year: 2020).*

"Multifocal Displays: Review and Prospect"; Zhan et al., PhotoniX, (2020) 1:10, 31 pages (Year: 2020).*

* cited by examiner

OPTICAL DISPLAY SYSTEM AND ELECTRONICS APPARATUS

CROSS-REFERENCE TO RELATED APPLICATIONS

This application is a National Stage of International Application No. PCT/CN2022/078657, filed on Mar. 1, 2022, which claims priority to U.S. Application No. 63/154,979, filed Mar. 1, 2021, both of which are hereby incorporated by reference in their entireties.

FIELD OF THE INVENTION

This disclosure relates to the technical field of optical display system, and more specifically, relates to an optical display system and an electronics apparatus.

BACKGROUND OF THE INVENTION

Head-mounted display (HMD) systems with immersive experience are also referred to as virtual reality (VR) displays. This immersive type of HMDs present virtual contents to the viewers independent of the viewer's real surroundings.

In conventional configurations, the HMDs systems composed of the refractive optics and display panels have heavy weight and large volume. However, the angular resolution of current HMDs is still far below human eye acuity. Most of current commercial VR displays can only offer angular resolution of around 10~15 pixel per degree (ppd) in the central region with a 110° field of view. However, the acuity of a normal person with 20/20 vision is about 1 arcmin, namely 60 ppd. Thus, the VR headset users can observe clear pixelation and screen-door effect, which would greatly degrade the immersive experience of virtual contents. To eliminate screen-door effect, over 6K×6K pixels would ultimately be needed for each eye. No matter for liquid crystal display (LCD) or organic light emitting diode (OLED) display, it will be a very challenging task to integrate over 36 million (6K×6K) pixels on a small display panel.

Therefore, there is a demand in the art that a new solution for optical display system shall be proposed to address both low-resolution and large-volume problems in the prior art.

SUMMARY OF THE INVENTION

According to a first aspect of the present disclosure, an optical display system is provided, comprising: a display unit, which generate a first image light and a second image light, wherein the first image light is in a first polarization state and the second image light is in a second polarization state, the first image light and the second image light are generated by a same display panel; a resolution enhancement optic unit, which enhances the resolution of the first image light with respect to the second image light; and a magnifying optic unit, which magnify the first and second image lights from the resolution enhancement optic unit.

According to a first aspect of the present disclosure, an electronics apparatus is provided, including the optical display system according to an embodiment.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Figure 1:
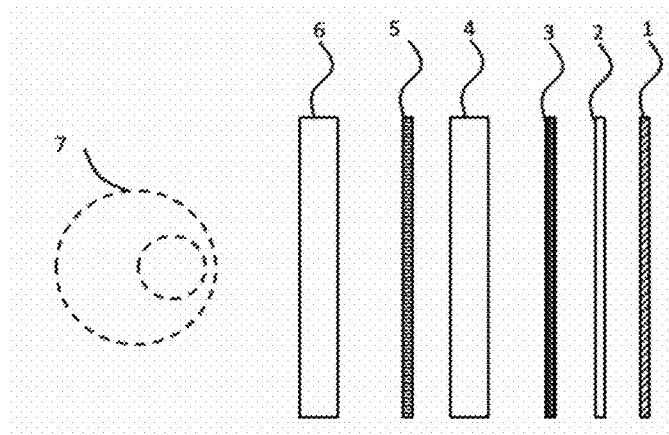
FIG. 1 is a schematic diagram of an optical display system with foveated imaging based on pancake system.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Notice that similar reference numerals and letters refer to similar items in the following figures, and thus once an item is defined in one figure, it is possible that it need not be further discussed for following figures.

Generally, two display panels can be used to achieve a multi-resolution foveated display. The first display panel provides a wide FOV but relatively low resolution for the surrounding region, while the second one offers an ultrahigh resolution for the central foveated region. However, this two display panels design will inevitably further increase the volume of the system.

To reduce the volume of the system, a pancake optical structure based on folded optical path can be used. A pancake HMD may include a pancake lens block and a display panel. It is difficult to insert a foveated system with two panel design into the compact pancake HMD optical system.

In an embodiment, an optical display system is proposed. The optical display system comprises: a display unit, which generate a first image light and a second image light, wherein the first image light is in a first polarization state and the second image light is in a second polarization state and the first image light and the second image light are generated by a same display panel; a resolution enhancement optic unit, which enhances the resolution of the first image light with respect to the second image light; and a magnifying optic unit, which magnify the first and second image lights from the resolution enhancement optic unit.

For example, the display unit generates the first image light and the second image light with the same resolution.

In an embodiment, the resolution enhancement optic unit may enhance the resolution of the first image light to form a foveated area of an image. The second image light may form other area of the image. For example, the resolution enhancement optic unit enhances the resolution of the first image light by more than 4 times, or by 4 to 5 times. As such, the first image light will have a higher resolution and the second image light will have a relatively lower resolution.

In a VR optical display system, angular resolution and device volume directly influence on the viewing feeling of a viewer who demands a high quality of viewing experiences. The optical display system proposed herein can achieve a foveated imaging based on pancake design. This optical display system can dramatically increase the angular resolution to eliminate the screen-door effect while reducing the volume of whole system with pancake design.

The foveated system concept with two panels, the principle of the polarization modulator, and the polarization-dependent optics used in our proposed system can be referred in [G. Tan, T. Zhan, Y H. Lee, J. Xiong, and S. T. Wu, "Polarization-multiplexed multiplane display," Opt. Lett. 43(22), 5651-5654 (2018); G. Tan, Y. H. Lee, T. Zhan, J. Yang, S. Liu, D. F. Zhao, and S. T. Wu, "Foveated imaging for near-eye displays," Opt. Express 26(19), 25076-25085 (2018); K. Yin, J. Xiong, Z. He, and S. T. Wu, "Patterning Liquid Crystal Alignment for Ultra-Thin Flat Optics," ACS Omega 5, 31485-31489 (2020)]. These documents are hereby incorporated in their whole by reference.

In this embodiment, a same display panel can be used to generate the surrounding image and the foveated image. So, the components for combining the images from two separated display panels can be omitted. This could reduce the volume of the optical display system.

In addition, by generating image lights with different polarizations, the first image light can be enhanced into a foveated image in the resolution enhancement optic unit, rather than the solution in which a foveated image is generated by a separate display panel. The system can achieve a foveated imaging based on two orthogonal polarizations states while keeping the compact system volume with pancake design.

FIG. 1 is a schematic diagram of optical display system with foveated imaging based on pancake system.

As shown in FIG. 1, the display unit includes the display panel 1 and a polarization modulator 2. The resolution enhancement optic unit includes a partial reflector 3, a first optic unit 4 and a polarized reflector 5. A second optics unit or a magnifying optic unit 6 is also shown in FIG. 1.

The display panel 1 generates images. The display panel 1 generates the first image light and the second image light. For example, the display panel 1 generates image lights for both high-resolution and low-resolution with same resolution and same panel. For example, the first image light and the second image light will be used for two resolution contents;

In an example, the first image light and the second image light are linear polarized image lights with orthogonal polarization states.

In another example, the first image light and the second image light are a vertical (90 degree) linear polarized image light and a horizontal (0 degree) linear polarized image light, respectively.

In still another example, the first image light and the second image light are a horizontal linear polarized image light and a vertical linear polarized image light, respectively.

In further another example, the first image light is a left-handed or right-handed circularly polarized image light and the second image light is a right-handed or left-handed circularly polarized image light.

Here, as an example, the first image light will be used as a foveated image light.

In an embodiment, the first image light and the second image light are generated by the same display panel 1 with a same resolution.

In an embodiment, the display panel 1 generates the first image light and the second image light simultaneously. The first image light and the second image light may be overlapped.

The polarization modulator 2 can separate the first image light and the second image light. Through the polarization modulator 2, the first image light and the second image light will have the orthogonal (opposite) polarization states. That is, the lights for two resolution contents will have opposite polarizations.

The polarization modulator 2 can perform a pixelated controlling of the polarization state of the image light to separate the first image light and the second image light with different polarizations. As such, the polarization modulator 2 can perform pixelated controlling of the polarization state of the image. The two resolution contents can be separated by the polarization modulator 2 with opposite polarizations.

The polarization modulator 2 modulates the first image light and the second image light into the first polarization state and the second polarization state. For example, the polarization modulator 2 separates the high-resolution and low-resolution parts into orthogonal polarization states, which is composed of an electronically controlled twisted nematic (TN) or a vertical alignment (VA) cell and a quarter-wave plate if necessary. The polarization modulator 2 is designed to obtain full-range modulation between two orthogonal polarization states. The required polarization modulation is not just to switch between two states; but continuous modulation to get intermediate states. Depend on the polarization response of the system, if the system is responded to linearly polarized light, the polarization modulator 2 can be a single electronically controlled TN or a VA cell; if the system is responded to circularly polarized light, the polarization modulator 2 may have a quarter-wave plate to convert the linearly polarized light to circularly polarized light.

In an example, the display panel 1 generates the first image light and the second image light in a time division multiplexing manner and the polarization modulator 2 modulates the first image light and the second image light into the first polarization state and the second polarization state in a time division multiplexing manner corresponding to that of the display panel.

In this manner, a foveated image can be obtained without increasing the resolution of the display panel.

In another embodiment, the display panel 1 generates the first image light and the second image light simultaneously without increasing a screen refresh rate. The polarization modulator 2 is a pixelated spatial polarization modulator. The pixelated spatial polarization modulator 2 separates the first image light and the second image light into the first polarization state and the second polarization state.

The partial reflector 3 transmits the first and second image light without changing their polarization states and reverses the polarization states thereof when reflecting them. The partial reflector 3 transmits the image light without changing its polarization and reflects the image light with its polarization being changed to the opposite/second polarization.

For example, the partial reflector 3 transmits all the image light without changing its polarization and reverses the polarization state when reflecting. For example, system responds to the circularly polarized light. The first polarization is a left-handed or right-handed circularly polarization and the second polarization is a right-handed or left-handed circularly polarization. For example, the partial reflector 3 can is a 50/50 reflector, which can transmit 50% of the incident image light and reflect 50% of the incident image light.

The first optic unit 4 includes at least one refractive lens to provide needed resolution enhancement for the first image light. For example, the first optic unit 4 is placed after the partial reflector 3. The first optic unit 4 may include at least one refractive lens for imaging magnified content. The first optic unit 4 may enhances the resolution of the first image light by more than 4 times or by 4 to 5 times.

The first optic unit 4 includes at least one refractive lens to provide the needed resolution enhancement of the foveated image. By tuning the focal length of the optics unit 4 and the distance between the optics, the resolution enhancement can easily achieve 4 to 5 times or even larger with the optimized parameters.

The polarized reflector 5 is placed after the first optic unit 4. The polarized reflector 5 reflects the image light of the first polarization with keeping its polarization state and transmits the image light of the second polarization without changing its polarization state. For example, the polarized reflector 5 is placed after the first optic unit 4. It reflects the image light of the first polarization with keeping the polarization state and transmits the image light of the second polarization without changing its polarization state.

The polarized reflector 5 can be any optics can achieve this feature. Such as the liquid-crystal-based optics with tunable bandwidth, and the combination of a reflective polarizer and a quarter wave plate.

Here, the partial reflector 3, the first optic unit 4 and the polarized reflector 5 can form a folded light path for the foveated image to achieve a higher resolution. For example, the size of the image of the first image light can be reduced and the resolution thereof can be enhanced through the partial reflector 3, the first optic unit 4 and the polarized reflector 5.

The second optic unit 6 may include at least one refractive lens as the eyepiece to magnify the images and provide property depth to the viewer's eye 7.

Figure 2:
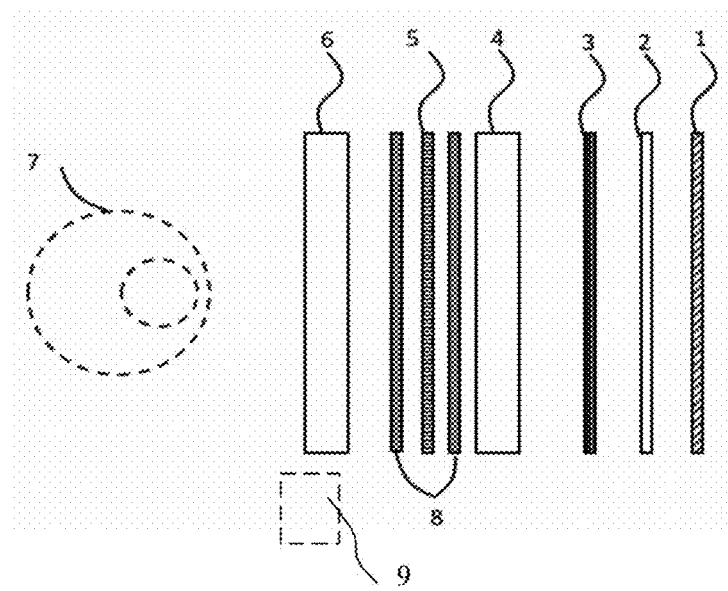
FIG. 2 is a schematic diagram of an optical display system with foveated imaging and eye tracking based on pancake system.

FIG. 2 shows a schematic diagram of an optical system with foveated imaging with eye tracking based on pancake system.

In FIG. 2, the optical display system further comprises a polarized deflector 8, placed before the magnifying optic unit 6. The polarized deflector 8 is electronically controlled and deflects the image with designed angle, thereby shifting a position of a foveated area formed by the first image light to match a position of a viewer's eye 7.

The polarized deflector 8 may be placed before or/and after the polarized reflector 5. The polarized deflector 8 may be placed after the first optic unit 4. The polarized deflector 8 can be two or more electrically/passive Pancharatnam-Berry deflectors or other optics that can achieve the imaging shifting.

Other components of the optical display system in FIG. 2 can be the same as those in FIG. 1. Thus, the repeated description of these components is omitted.

As shown in FIG. 2, the optical display system may further comprise an eye tracking unit 9, which tracks a position of an eye 7 of a viewer and is coupled to the polarized deflector 8 to control the polarized deflector 8 to deflect the image with designed angle.

Figure 3:
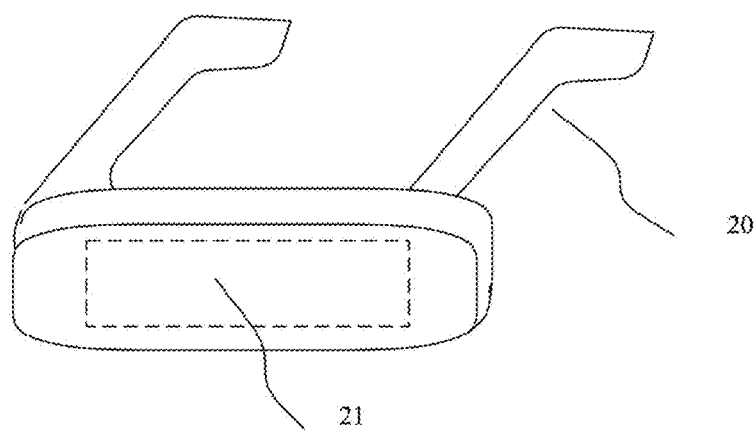
FIG. 3 is a schematic block diagram of an electronic device according to an embodiment.

FIG. 3 shows a schematic block diagram of an electronic device according to an embodiment. As shown in FIG. 3, an electronics apparatus 20 includes the optical display system 21 as described above.

For example, the electronics apparatus may be a head-mounted display (HMD) device. The electronics apparatus 20 may be a virtual reality (VR) device or an augmented reality (AR) device.

Although some specific embodiments of the present invention have been demonstrated in detail with examples, it should be understood by a person skilled in the art that the above examples are only intended to be illustrative but not to limit the scope of the present invention.

What is claimed is:
1. An optical display system, comprising:
a display panel, adapted to generate a first image light and a second image light in a time division multiplexed manner, wherein the first image light and the second image light are generated by the same display panel,
a polarization modulator, arranged optically downstream of the display panel, and adapted to modulate the first image light and the second image light into a first polarization state and a second polarization state in a time division multiplexed manner corresponding to that of the display panel,
a resolution enhancement optic unit, arranged optically downstream of the polarization modulator, and adapted to enhance a resolution of the first image light with respect to the second image light;
a magnifying optic unit, arranged optically downstream of the resolution enhancement optic unit, and adapted to magnify the first and second image lights from the resolution enhancement optic unit; and
a polarized deflector, placed before the magnifying optic unit,
wherein the resolution enhancement optic unit includes a partial reflector, a first optic unit and a polarized reflector,
wherein the partial reflector is adapted to transmit the first image light and the second image light without changing their polarization states and reverse the polarization states thereof when reflecting them,
wherein the first optic unit includes at least one refractive lens to provide needed resolution enhancement for the first image light,
wherein the polarized reflector is adapted to reflect an image light of a first polarization with keeping its polarization state and transmit an image light of a second polarization without changing its polarization state,
wherein the polarized deflector comprises two Pancharatnam-Berry deflectors arranged on both sides of the polarized reflector, and
wherein the polarized deflector is electronically controlled and adapted to deflect an image with designed angle, thereby shifting a position of a foveated area formed by the first image light to match a position of a viewer's eye.

2. The optical display system according to claim 1, wherein the display panel is adapted to generate the first image light and the second image light simultaneously without increasing a screen refresh rate.

3. The optical display system according to claim 2, wherein the polarization modulator is a pixelated spatial polarization modulator,
wherein the pixelated spatial polarization modulator is adapted to separate the first image light and the second image light into the first polarization state and the second polarization state.

4. The optical display system according to claim 1, wherein the display unit is adapted to generate the first image light and the second image light with a same resolution.

5. The optical display system according to claim 4, wherein the resolution enhancement optic unit is adapted to enhance the resolution of the first image light by more than 4 times.

6. An electronics apparatus, including the optical display system according to claim 1.

* * * * *